United States Patent [19]

Buback

[11] Patent Number: 4,640,146
[45] Date of Patent: Feb. 3, 1987

[54] MULTIRATIO CONSTANT MESH CHANGE SPEED TRANSMISSION

[75] Inventor: John Buback, Pontiac, Mich.

[73] Assignee: Massey-Ferguson Inc., Des Moines, Iowa

[21] Appl. No.: 488,495

[22] Filed: Apr. 25, 1983

[51] Int. Cl.$^4$ ............................................. F16H 3/08
[52] U.S. Cl. ........................................ 74/359; 74/331; 74/333; 74/745
[58] Field of Search ................ 74/359, 360, 331, 740, 74/745, 333, 413; 192/85 AA, 48.91

[56] References Cited

U.S. PATENT DOCUMENTS

| | | | |
|---|---|---|---|
| 2,511,039 | 6/1950 | Black | 74/720 |
| 2,526,919 | 10/1950 | Wilson | 74/333 |
| 2,661,633 | 12/1953 | Suberkrub | 74/665 |
| 2,670,633 | 3/1954 | Schoepe et al. | 74/359 |
| 2,701,477 | 2/1955 | Schoepe | 74/364 |
| 2,712,245 | 6/1955 | Lee | 74/360 |
| 2,804,780 | 9/1957 | Gerst | 74/360 |
| 2,953,942 | 9/1960 | Schwartz et al. | 74/331 |
| 2,972,901 | 2/1961 | Gerst | 74/359 X |
| 2,998,732 | 9/1961 | Nelson | 74/364 |
| 3,064,488 | 11/1962 | Lee et al. | 74/360 |
| 3,073,423 | 1/1963 | Lee et al. | 192/4 |
| 3,080,767 | 3/1963 | Price, Jr. | 74/360 |
| 3,102,432 | 9/1963 | Gerst | 74/360 |
| 3,126,752 | 3/1964 | Bolster | 74/359 |
| 3,130,595 | 4/1964 | Cook | 74/331 |
| 3,142,195 | 7/1964 | Henyon | 74/359 |
| 3,149,498 | 9/1964 | Mack | 74/364 |
| 3,181,385 | 5/1965 | Siler | 74/360 X |
| 3,232,125 | 2/1966 | Lee et al. | 74/360 X |
| 3,248,971 | 5/1966 | Lee et al. | 74/732 |
| 3,318,167 | 5/1967 | Frost | 74/331 |
| 3,350,951 | 11/1967 | Frost et al. | 74/360 |
| 3,515,014 | 6/1970 | Hagen | 74/665 |
| 3,675,508 | 7/1972 | Blank | 74/745 |
| 3,799,003 | 3/1974 | Van Dest | 74/767 X |
| 3,858,455 | 1/1975 | Sisson et al. | 74/331 X |
| 3,893,345 | 7/1975 | Sisson et al. | 74/331 |
| 3,913,411 | 10/1975 | Jameson | 74/360 |
| 3,991,634 | 11/1976 | Longshore | 74/745 |
| 4,145,935 | 3/1979 | Herlitzek | 74/360 X |
| 4,392,391 | 7/1983 | Jameson et al. | 74/331 X |

FOREIGN PATENT DOCUMENTS

| | | | |
|---|---|---|---|
| 1059777 | 6/1959 | Fed. Rep. of Germany . | |
| 0054757 | 4/1982 | Japan | 74/360 |
| 1045834 | 10/1966 | United Kingdom . | |
| 2036891 | 7/1980 | United Kingdom | 74/359 |
| 2036892 | 7/1980 | United Kingdom . | |
| 2076910 | 12/1981 | United Kingdom . | |

*Primary Examiner*—Leslie A. Braun
*Assistant Examiner*—Dwight G. Diehl
*Attorney, Agent, or Firm*—Robert L. Farris

[57] ABSTRACT

A transmission utilizing a plurality of clutch packs, each of which couples the driving and driven gears of one of a plurality of gear sets, the plurality of clutch packs and gear sets being arranged equal radial distances about the input and output of a transmission with the input gear in constant mesh with the driving gears of the radially arranged gear sets and the output gearing in constant mesh with the driven gears of the gear sets.

6 Claims, 9 Drawing Figures

| NO. OF CLUTCHES FRONT SECTION | NO. OF CLUTCHES REAR SECTION | NO. OF GEARS IN MESH | NO. OF FWD. SPEEDS | NO. OF REV. SPEEDS |
|---|---|---|---|---|
| 2 | 2 | 5 | 2 | 2 |
| 3 | 2 | 6 | 4 | 2 |
| 3 | 3 | 7 | 6 | 3 |
| 4 | 3 | 8 | 9 | 3 |
| 4 | 4 | 9 | 12 | 4 |
| 5 | 4 | 10 | 16 | 4 |
| 5 | 5 | 11 | 20 | 5 |

Fig-8

| | $A_1$ | $B_1$ | $C_1$ | $D_1$ | $E_1$ | $A_2$ | $B_2$ | $C_2$ | $D_2$ | $E_2$ |
|---|---|---|---|---|---|---|---|---|---|---|
| $R_1$ | | ✓ | | | | | | | | ✓ |
| $R_2$ | | ✓ | | | | | ✓ | | | |
| $R_3$ | | ✓ | | | | | | | ✓ | |
| $R_4$ | | ✓ | | | | | | | | ✓ |
| $R_5$ | | ✓ | | | | | | ✓ | | |
| $F_1$ | | | | ✓ | | | | | | ✓ |
| $F_2$ | | | | ✓ | | | ✓ | | | |
| $F_3$ | | | | ✓ | | | | | ✓ | |
| $F_4$ | | | | ✓ | | ✓ | | | | |
| $F_5$ | | | | ✓ | | | | ✓ | | |
| $F_6$ | | | ✓ | | | | | | | ✓ |
| $F_7$ | | | ✓ | | | | ✓ | | | |
| $F_8$ | | | ✓ | | | | | | ✓ | |
| $F_9$ | | | ✓ | | | ✓ | | | | |
| $F_{10}$ | | | ✓ | | | | | ✓ | | |
| $F_{11}$ | ✓ | | | | | | | | | ✓ |
| $F_{12}$ | ✓ | | | | | | ✓ | | | |
| $F_{13}$ | ✓ | | | | | | | | ✓ | |
| $F_{14}$ | ✓ | | | | | ✓ | | | | |
| $F_{15}$ | ✓ | | | | | | | ✓ | | |
| $F_{16}$ | | ✓ | | | | | | | | ✓ |
| $F_{17}$ | | ✓ | | | | | ✓ | | | |
| $F_{18}$ | | ✓ | | | | | | | ✓ | |
| $F_{19}$ | | ✓ | | | | ✓ | | | | |
| $F_{20}$ | | ✓ | | | | | | ✓ | | |

Fig-9

MULTIRATIO CONSTANT MESH CHANGE SPEED TRANSMISSION

FIELD OF THE INVENTION

The present invention relates generally to power transmissions, and more particularly to that type of transmission provided with a plurality of gears which are in constant mesh, the output speed of which can be varied by engaging suitable clutches within the transmission.

DESCRIPTION OF THE PRIOR ART

Conventional transmissions such as the type used in farm tractors or the like provide a plurality of speed ratios in each of the forward and reverse directions. These various speed ratios adapt the tractor for the torque ratios needed in driving the tractor to accommodate the various draft loads which may be imposed upon the tractor by an implement, as well as for other requirements of the implement secured to the tractor. Speed ratios in tractors in excess of four speeds are usually provided by providing a high low range output. In addition, the transmission may also be provided with a three speed input. One such transmission is shown in U.S. Pat. No. 3,799,003 and such a transmission is capable of producing 24 forward speeds and 8 eight reverse speeds. The forward 3 speed input utilizes a special planetary gearing construction and it has been found in practice that relatively high tolerance parts must be utilized, which parts significally increase the cost of the transmission.

It is also relatively well known in the tractor field to utilize clutch packs in drive lines to couple a driving shaft with a driven shaft and the prior art clutch pack designs have achieved a relatively high level of reliability and are also, relatively speaking, of low cost.

The prior art has suggested the utilization of clutch pack assemblies in transmissions but such transmissions have tended to be relatively sophisticated. Typical examples are shown in U.S. Pat. Nos. 2,701,477, 3,064,488, 3,126,752 and 3,893,345.

OBJECTS OF THE INVENTION

It is an object of the present invention to provide a transmission utilizing a plurality of clutch packs, each of which couples the driving and driven gears of one of a plurality of gear sets, the plurality of clutch packs and gear sets being arranged circumferentially about and equal radial distances from the input and output gearing of a transmission with the input gear in constant mesh with the driving gears of the gear sets and the output gearing in constant mesh with the driven gears of the gear sets.

By utilizing the foregoing design principles it is possible to provide a transmission which is capable of relatively simple design modification to provide differing numbers of forward speeds. In addition, it is possible by using the principles set forth above to stack arrays of gear sets and clutch packs to assemble a transmission having a large number of forward speeds. In addition by utilizing the principles set forth it is possible to utilize clutches of well known construction which have high reliability and relatively low costs.

The foregoing will become more apparent from the following detailed description taken in conjunction with the accompanying drawings in which preferred forms of this invention are illustrated.

DETAILED DESCRIPTION

Figure 1:
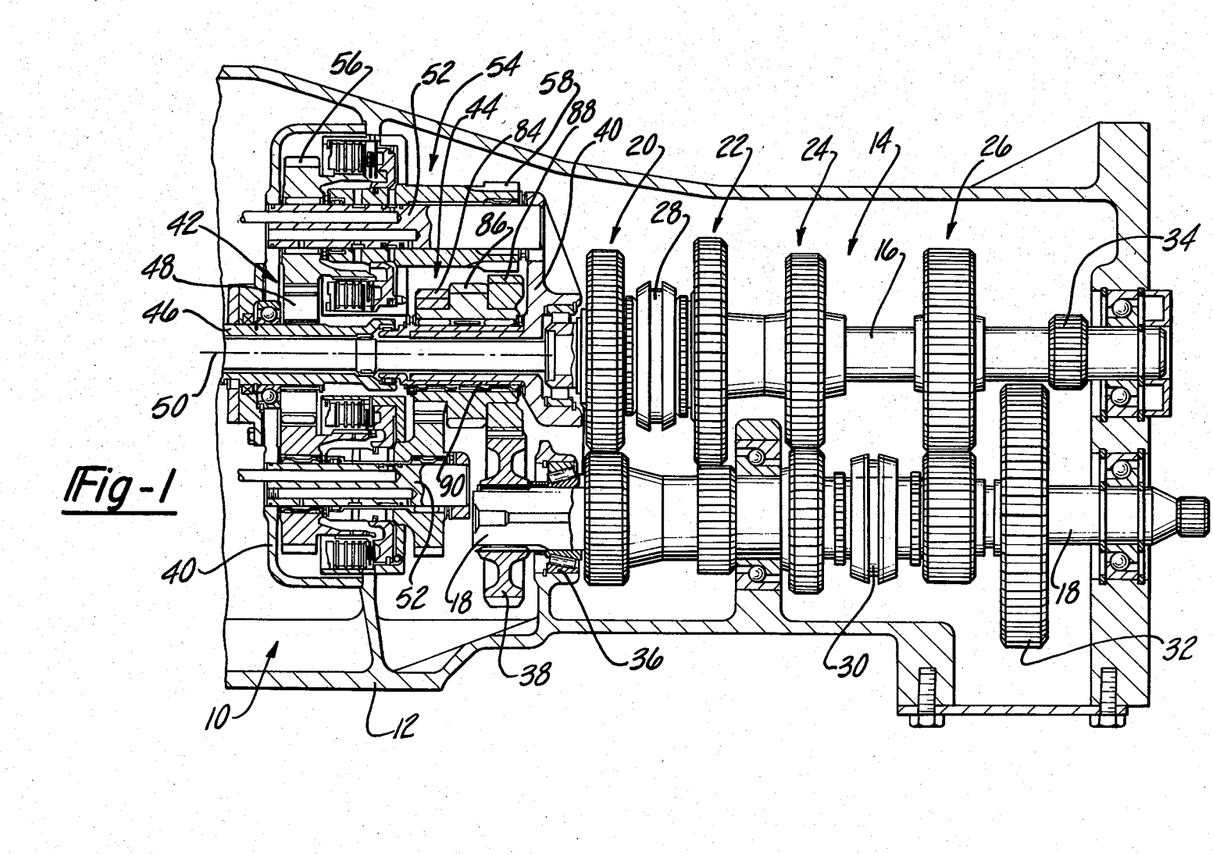
FIG. 1 is a side view of a transmission in which the principles of this invention have been incorporated, portions of the transmission being shown in section.
Figure 2:
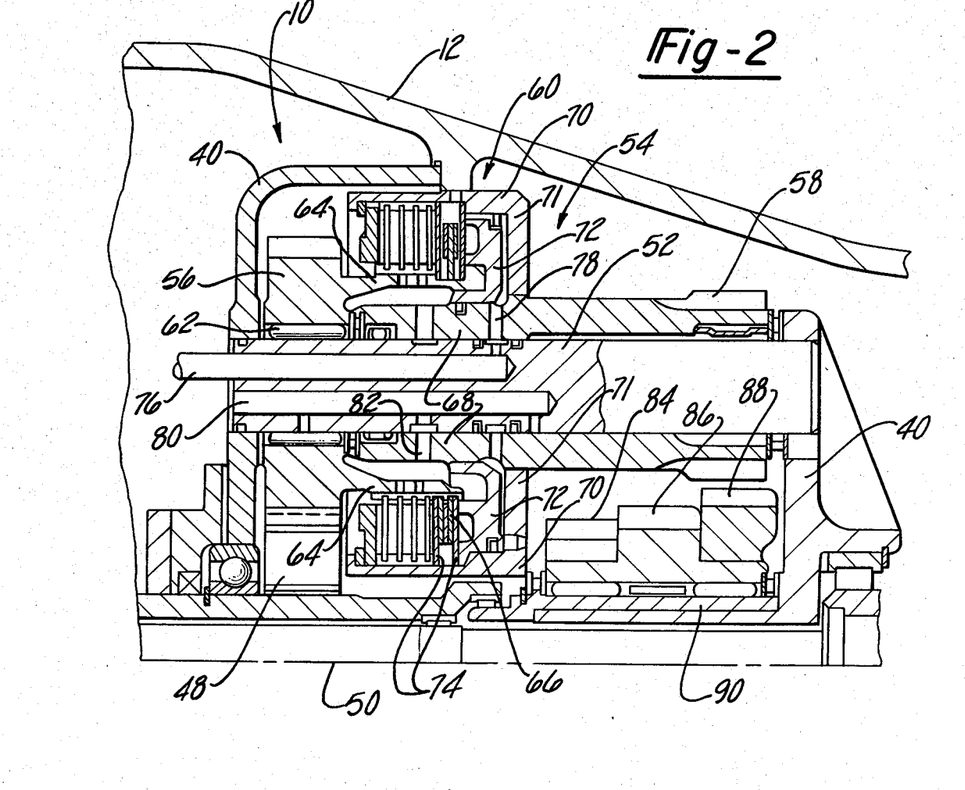
FIG. 2 is an enlarged view of a portion of the transmission illustrated in FIG. 1.
Figure 3:
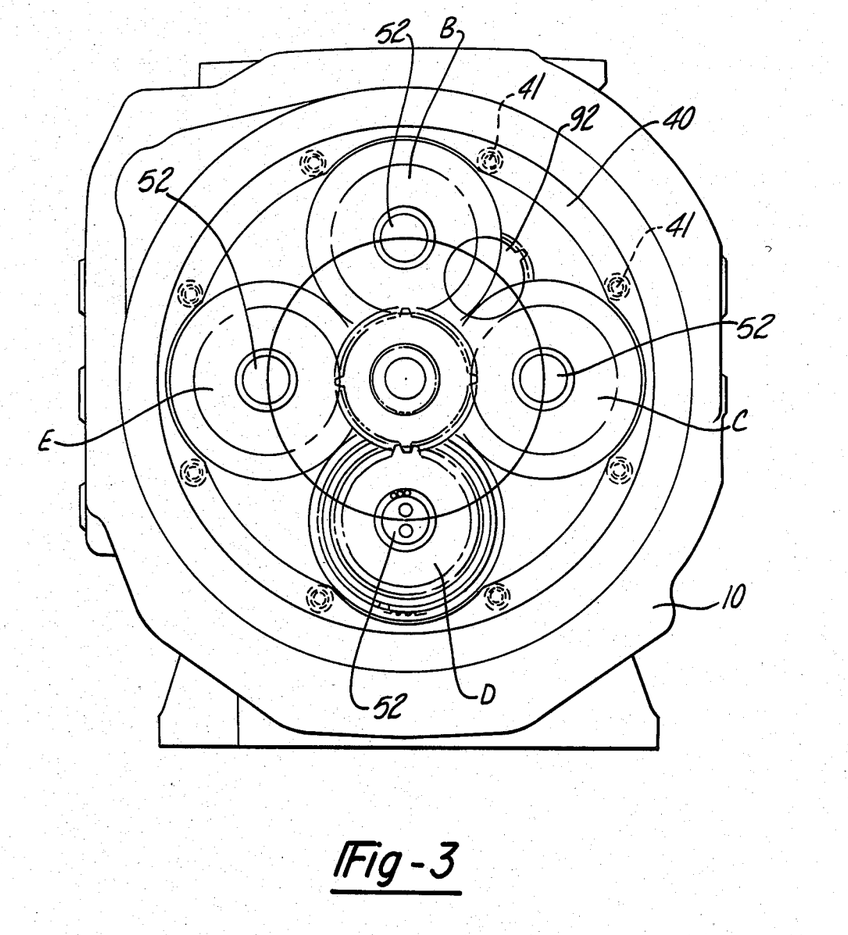
FIG. 3 is a left hand end view of the transmission shown in FIG. 1.
Figure 5:
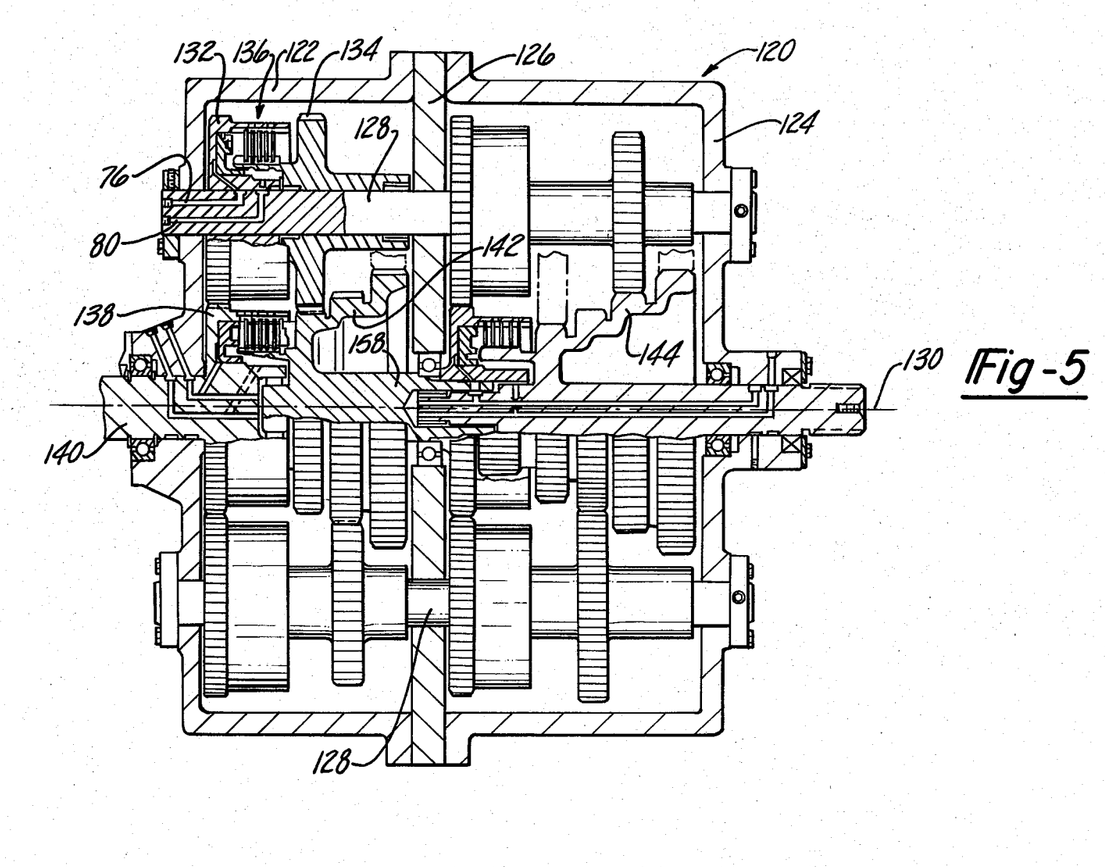
FIG. 5 is a side view of an alternate form of transmission in which the principles of the present invention may be utilized, portions of the transmission being shown in section.
Figure 6:
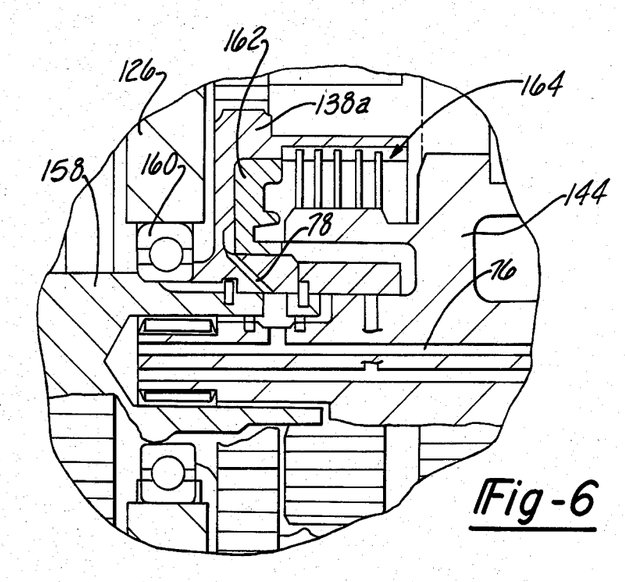
FIGS. 6 and 7 are enlarged details of the transmission illustrated in FIG. 5.
Figure 7:
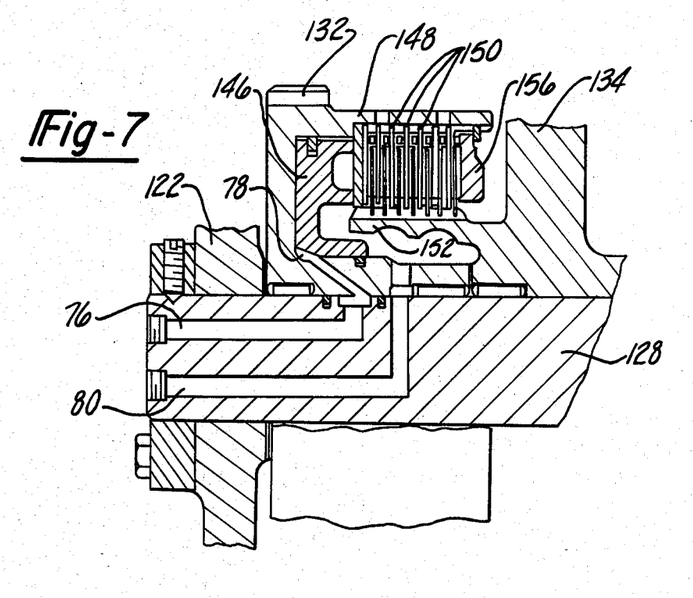

In both the embodiments of FIGS. 1–3 and the embodiments of FIGS. 5–7 the same general principles of consruction is utilized. Thus, a plurality of gear sets are disposed in about coaxial input and output means, each gear set including a first or driving gear and a second or driven gear, the first and second gears being in constant driving relationship with either an input gear or with an associated output gear. In addition, a plurality of clutches are disposed between the first and second gears, and control means are provided which are capable of causing only one of the clutches to be engaged. The output means includes a cluster of spaced apart output gears of varying diameters, each of the spaced apart output gears being in constant mesh with one of the second gears. In the embodiment illustrated in FIGS. 1–3 there is a single array of gear sets and the output means are coupled to a shift collar transmission of the type having eight additional gears. In the embodiment of FIGS. 5–7 two arrays of gear sets are illustrated, the output of the first array being coupled to the input of the second array. Thus, by stacking two arrays it is possible to provide a transmission having, in the configurations illustrated, up to 20 forward speeds and 5 reverse speeds. It should be obvious that such a transmission would utilize many common parts as the clutches would be substantially identical and many common gears would be utilized. The advantages of such a design should be apparent to those skilled in the art. The foregoing brief description of the two embodiments will be more fully understood after the following detailed description. In the following description of the first and second embodiments like elements will bear the same reference numerals.

DETAILED DESCRIPTION OF THE FIRST EMBODIMENT

Referring first to the embodiment shown in FIGS. 1–3, the transmission of this invention may be associated with another transmission, for example the shift collar transmission shown in U.S. Pat. No. 3,799,033. More specifically, the transmission of this embodiment, which is indicated generally at 10, may be disposed within a transmission housing 12 of the type capable of also supporting a shift collar transmission, such transmission being indicated generally at 14. As such shift collar transmissions are well known in the art they will not be described in detail here. However, it should be noted that the shift collar transmission has spaced apart shafts 16, 18 upon which are mounted a plurality of gear sets in constant mesh, such gear sets being indicated at 20, 22, 24 and 26. Shift collars 28 and 30 are also provided. When one of the shift collars is moved from the neutral intermediate position illustrated in FIG. 1 to an engaged position an associated gear will be coupled to an associated shaft. Thus, for example, if shift collar 28 is moved to the left the top gear of the gear set 20 will be coupled to the shaft 16. In the embodiment illustrated the shaft 18 is split approximately in the location of the shift collar 30 and each portion of the shaft 18 can rotate independently of the other. It can also be seen that four differing speeds can be achieved by moving the shift collars 28 and 30 either to the left or to the right, only one collar being moved to an engaged position. This four speed portion of the transmission can be multiplied by two by shifting the final output gear 32 from the left position shown in FIG. 1 where it is coupled with the lower gear of gear set 26 to the right position where the output gear 32 is coupled with another gear 34 on the top shaft 16. The output gear 32 is provided with internal splines which engage splines (not shown) on the shaft 18 and thus cause the shaft 18 to rotate when the gear 32 is in engagement with either the bottom gear of the output gear set 26 or said another gear 34. As this form of transmission is well known, having been in public use for a number of years on the Massey-Ferguson 2675 and 2680 tractors, it will not be described in further detail.

The input to the shift collar transmission just described is through the forward end of the shaft 18 which is journalled for rotation on bearing 36. A gear 38 is secured to the forward end of the shaft 18, for example by splines, and is capable when rotated of causing the forward end of the shaft 18 to rotate. In accordance with principles of this embodiment a multiratio constant mesh change speed transmission, which is indicated generally at 10, is mounted within the forward end of the housing 12, the output of the transmission 10 being coupled to the gear 38.

The transmission 10 includes a housing 40, a portion of which is illustrated. Housing 40 can be secured to the main transmission housing 12 by suitable means, for example by bolts 41 (FIG. 3). Journalled for rotation within the housing 40 are independently rotatable input and output means indicated generally at 42 and 44, respectively. The input means includes an input shaft 46, which may be in the form of a quill shaft and an input gear 48 which is mounted on the shaft 46 for rotation therewith.

Disposed equal radial distances away from the central axis 50 of the input and output means are a plurality of fixed support shafts 52, which support shafts are carried by the housing. As can be seen from FIG. 3 the support shafts are spaced 90 degrees away from each other. While a 90 degree spacing is deemed to be ideal when using the transmission housing 12, it should be appreciated that other spacings could be utilized when utilized with other housings. Thus, spacings of 120 degrees could be utilized.

Rotatably disposed about each of the shafts 52 is a gear set 54, each gear set having a first or driving gear 56 and a second or driven gear 58. Disposed between the first and second gears is a clutch pack assembly indicated generally at 60 (FIG. 2). As can best be seen from FIG. 2 the first gear 56 is journalled on the shaft 52 by a bearing 62. In addition, the first or driving gear 56 is in constant mesh with the input gear 48. Extending rearwardly from the first gear 56 is a cylindrical extension 64 upon which are slidably mounted a plurality of clutch disks 66. Extending forwardly from the second or driven gear are inner and outer cylindrical members 68 and 70, and end wall 71, the outer cylindrical member cooperating with the inner cylindrical member and end wall 71 to provide an annular cylinder in which an annular piston 72 may be moved. Keyed to the outer cylindrical member or portion 70 are a further plurality of clutch disks 74 which are disposed in interleaving arrangement with the clutch disks 66. When the annular piston 72 is in the right hand position illustrated in FIG. 2 the gear 56 will be free to rotate relative to the gear 58. However, as fluid is introduced into the chamber behind the annular piston 72 through line 76 and ports 78 the clutch disks 66 which are keyed to the first portion 64 of the clutch pack and the clutch disks 74 which are keyed to the second portion 70 of the clutch pack will become locked together. When this happens, rotation of gear 56 will cause similar rotation of gear 58. When fluid pressure is released from line 76 the annular piston will move to the right permitting movement of 56 again with respect to gear 58. At this point it should be observed that oil cooling means are provided to prolong the lives of the clutch disks 66 and 74, the oil cooling means including an oil line 80 in shaft 52 and ports 82.

The output means 44 includes a cluster of spaced apart output gears of varying diameters, all of the output gears being rotatable together. Thus, the cluster of gears as shown in FIG. 1 includes first, second and third output gears 84, 86, 88, respectively. In the embodiment illustrated in FIG. 1 the output gears are journalled for rotation on a stationary quill shaft 90, and gear 88 is in constant mesh with gear 38.

As illustrated in FIG. 3, the various clutch packs disposed about the support shafts 52 are indicated by reference characters B, C, D and E. The output gear 52 of clutch pack D is in constant mesh with gear 84 as can also be seen from FIG. 1. Output gears 58 of assemblies E and C will be in engagement with gears 86 and 88. The output gear 58 on B will be in engagement with a reverse idler 92 which is also in engagement with gear 88.

It should be observed at this point that if a clutch pack associated with either C, D or E is caused to lock up the asssociated input and output gears a differing forward output speed is achieved. Similarly, if the clutch pack associated with B is locked up a reverse output is provided. It is, however, possible to provide one additional forward speed for the type of transmission illustrated in FIGS. 1, 2 and 3. To this end, if desired, and if space permits, an additional clutch pack assembly could be disposed between the input shaft 46 and the cluster of spaced apart output gears 84, 86 and 88.

Figure 4:
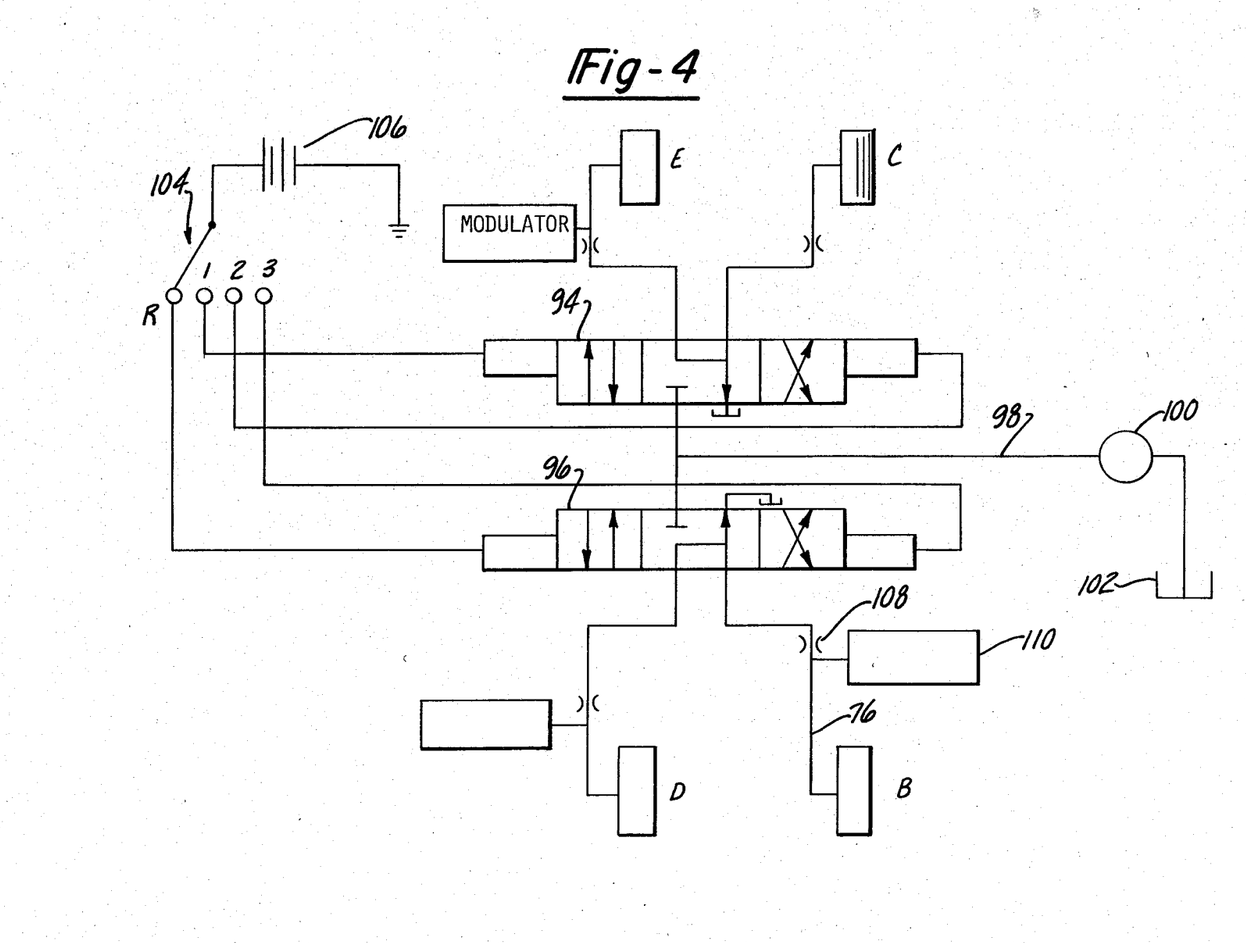
FIG. 4 illustrates one form of control means which may be used with the transmission illustrated in FIGS. 1–3.

While the control means per se does not form part of the present invention one form of control means which may be utilized with the invention shown in FIGS. 1–3 is illustrated in FIG. 4. This design utilizes two three-position four port valves, each of which, is spring biased to a neutral position and which may be shifted to either of its extreme positions under the influence of a solenoid. These valves are indicated at 94 and 96. An inlet port of each of these valves is connected with a common manifold 98 which contains fluid under pressure, the manifold in turn receiving the fluid from pump 100 and reservoir 102. The position of each of the spool valves is controlled by a common rotary electric selector 104. When the control knob is in the R position current will flow from the battery 106 to the left hand solenoid on valve 96 to cause the valve to shift to the left. When this occurs fluid will be directed to line 76 associated with the clutch pack assembly B thus placing the transmission 10 in the reverse mode. A restrictor 108 and modulator 110 may be associated with the line 76 as it extends between the transmission 10 and the valve 96 for control in the rate of engagement and/or disengagement. At the same time the valve 96 is shifted in left hand position all other clutch packs namely C, D and E will be connected to reservoir to permit the fluid within the clutch packs to drain. If it is now desired to shift the transmission into low gear the rotary selector 104 is now moved from the R position to the 1 position which will cause current to be directed to the left hand solenoid on valve 94 which will in turn cause this valve to shift to its left hand position. In the meantime, valve 96 has been returned to its centered position by the action of the springs. Fluid flow will now be directed from the pump 100 into the clutch pack C.

It should be noted that the transmission embodied in FIGS. 1-4 is of the type where all gears are in constant mesh and that the driving connections are established solely by the action of clutch packs. The control means is of the type which will permit only one of the clutch packs to be engaged at one time. As the mechanisms of each of the clutch packs B, C. D and E is essentially the same, with the exception of the length and diameter of the output gears 58, the advantages accruing from the utilization of innerchangeable parts is achieved. Also, as clutch packs are utilized relatively high torque capacities are achieved in a reasonably small package.

DESCRIPTION OF THE EMBODIMENT OF FIGS. 5-7

In the previously described embodiment of FIGS. 1-3 only a single array of clutch packs B, C, D and E are utilized. However, as previously noted, by utilizing a double array of clutch packs a much greater number of output speeds can be achieved through the use of this invention. This feature is illustrated in FIGS. 5, 6 and 7 wherein two arrays of clutch packs may be utilized, the radially disposed clutch packs on the left hand side being indicated by a subscript 1 in FIG. 9, and the orbitally disposed clutch packs on the right hand side being indicated by a subscript 2 in FIG. 9. In the left hand array both the input and output are concentric. Similarly, in the right hand array both the input and output are concentric. It should be recalled that in the embodiment of FIGS. 1-3 while the output could be considered to be concentric with the input it was in fact a drop to gear 38 and shaft 18. This feature is not the case in the embodiment of FIGS. 5-7. In the transmission illustrated in FIGS. 5, 6 and 7 a transmission housing is provided, the housing being indicated generally at 120. The housing includes spaced apart front and rear clam shells 122 and 124 having front and rear walls and an intermediate wall 126 between the clam shell housings.

A plurality of support shafts are carried by the front, rear and intermediate walls, the support shafts 128 all being spaced equal radial distances from the common center line 130 of the input and output means. Journalled about the shafts are driving and driven gears 132 and 134 and associated clutch pack assemblies 136. Thus, if one were to look at the transmission shown in FIG. 5 from the left hand end he would see a first gearing set and clutch pack assembly $B_1$ in the twelve o'clock position, a second gearing set and clutch pack assembly $C_1$ in the three o'clock position a still further gearing set and clutch pack assembly $D_1$ in the six o'clock position and yet another gearing set and clutch pack assembly $E_1$ in the nine o'clock position. The driving gears 132 are all coupled with an input gear 138 which is in turn interconnected with an input shaft 140 rotatable within the housing 132. The same arrangement of gear sets and clutch packs would also appear in the right hand array within the housing 124 and would include gear set and associated clutch pack assemblies $B_2$, $C_2$, $D_2$ and $E_2$ in the same relative position. The fundamental difference between the two sides of the transmission relates to the output gearing. Thus, in the left hand array the output gearing 142 includes a cluster of three spaced apart output gears of varying diameters whereas in the right hand array the output gearing 144 includes a cluster of four spaced apart output gears of varying diameters. The reason for this is that in one of two arrays, namely, in this embodiment, the left hand array, one gear set and clutch pack array drives an idler gear which in turn drives one of the output gears in a reverse direction whereas another gear set and clutch pack drives the same gear in a forward direction. Thus, the left hand output gearing 142 only needs to include three sets of gear teeth wherein the right hand output gearing 144 needs to include four sets of teeth if four sets of gearing and clutch packs are to be utilized. Each of the support shafts 128 is provided with suitable fluid lines and ports 76 and 80 for actuating an associated clutch pack and for providing fluid cooling.

As the clutch packs are somewhat different in the modification illustrated from that shown in FIGS. 1 and 2, they will be described with reference to FIG. 7. In the design shown in FIG. 7 the driving gear 132 is provided with an annular cylindrical recess which in turn receives an annular piston 146. A cylindrical extension 148 extends to the right of the driving gear 132 and a plurality of clutch disks 150 are keyed thereto. The driven or second gear 134 is provided with another cylindrical extension 152 but of reduced diameter than the extension 148. This extension extends towards the gear 132 and also carries a plurality of clutch disks 154 which are keyed thereto and innerleaved with the clutch disks 150. A stop 156 is carried by the extension 148. When fluid is introduced into the line 76 and ports 78 the annular piston 146 will be moved to the right forcing the clutch disks into engagement with each other as they are locked up between the piston 146 and stop 156 which will then in turn cause gear 132 to drive gear 134.

As previously noted, it may be desirable to have a direct drive connection between the input 140 and the output 142. To this end a further clutch pack may be provided and such a clutch pack is illustrated in FIG. 5 wherein a clutch pack extends between the input portion 140 to the gearing array 142 as illustrated. At this point it should be noted that the output gearing 142 has a centrally disposed shaft portion 158 which is journalled into intermediate wall 126 by bearing 160 (FIG. 6), the shaft portion 158 extending to the right of the intermediate wall 126 and having an input gear $138_2$ mounted thereon. This gear in general has the configuration of the gear 132 and thus it may receive an annular piston 162 which can be shifted to the right by the introduction of fluid pressure in passage 76 and port 78 to lock up the clutch pack disks indicated generally at 164 to cause the output gearing 144 to be locked to the shaft 158.

Figure 8:
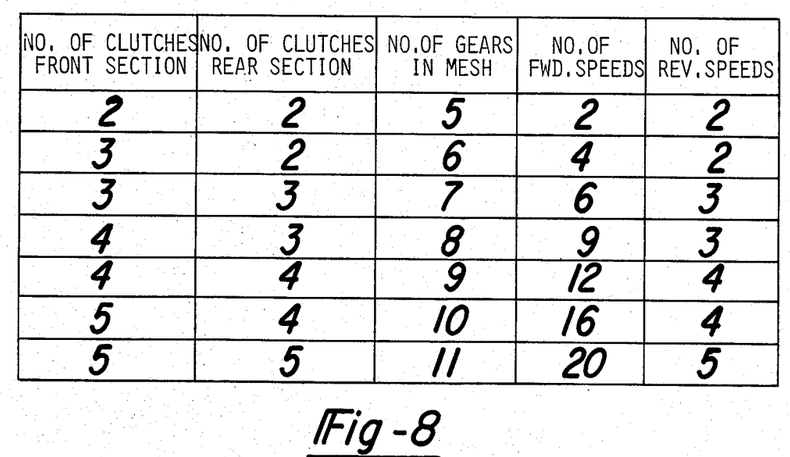
FIG. 8 is a table showing how the transmission of FIG. 5 can be designed to give a variety of forward and reverse speeds ranging from two forward speeds to twenty forward speeds.
Figure 9:
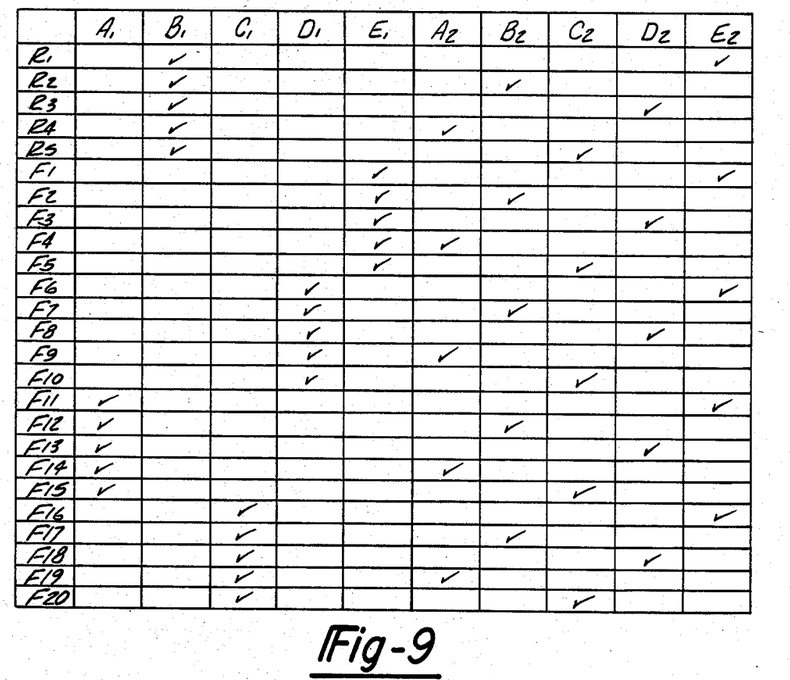
FIG. 9 is a table illustrating the necessary engagements for a twenty speed transmission.

While the design illustrated in FIGS. 5, 6 and 7 has been described with having a full array of gear sets and clutch pack assemblies it should be noted that less than a full array may be utilized. Thus, it may be desirable to utilize a number less than the full array and the various combinations possible are set forth in FIG. 8. However, when utilizing a full array the number of speeds both reverse and forward which can be obtained are indicated in FIG. 9 which shows which clutch packs should be engaged for each of the particular reverse or forward gears. It should be noted that a control means similar to that shown in FIG. 4 may be utilized, the control means including two selector knobs instead of one and also utilizing one additional valve for the extra direct drive clutch pack. Thus, a further two position valve would be utilized, the two position valve normally being spring biased to a drain position as are the valves 94 and 96, but which could be moved under the action of a solenoid to such a position where fluid from the manifold can be directed to the clutch pack A. While the rotary selector valves necessary for use with the embodiment of FIGS. 5, 6 and 7 would have five positions, if all clutch packs were being utilized, it is also possible to have a six or neutral position where none of the clutch packs would be caused to be engaged.

What is claimed is:

1. A multiratio constant mesh change speed transmission comprising:

a transmission housing;

an input gear rotatably mounted within the transmission housing for rotation about a central axis;

a plurality of support shafts nonrotatably carried by the transmission housing substantially equal radial distances away from said central axis;

a pair of gears rotatably journalled on each of said support shafts, each of said pair of gears including a first gear in constant mesh with said input gear, and a second gear;

a clutch pack assembly rotatably journalled on each of said support shafts, each assembly extending between the first and second gears and being capable when engaged of causing the first gear to be drivingly coupled to the second gear;

a further shaft mounted within the housing coaxial with the central axis;

a cluster of spaced apart output gears mounted on said further shaft for rotation with each other and each of said output gears being in constant mesh with one of said second gears; and control means capable of selectively engaging one of said clutch pack assemblies at a time, whereby the output speed of the transmission can be varied.

2. The multiratio constant mesh change speed transmission as set forth in claim 1 wherein an idler gear is disposed between the second gear of one of the gear sets and an associated gear of the cluster of spaced apart output gears, the clutch pack associated with said second gear being capable of establishing a reverse drive when engaged.

3. The multiratio constant mesh change speed transmission as set forth in claim 2 in which the second gear of another gear set is in engagement with said associated gear of said cluster of spaced apart output gears.

4. The multiratio constant mesh change speed transmission as set forth in claim 1 further characterized by the provision of an output shaft spaced away from the axis of rotation of the spaced apart output gears, and another gear mounted on said output shaft, said another gear being in constant mesh with one of said cluster of spaced apart output gears.

5. The multiratio constant mesh change speed transmission as set forth in claim 1 wherein each of the clutch pack assemblies is fluid operated, and further characterized by the provision of a fluid line extending axially through each of the support shafts, which fluid line is interconnectible with the clutch pack by means of a radially extending port.

6. The multiratio constant mesh change speed transmission as set forth in claim 1 wherein each of the clutch pack assemblies is oil cooled and further characterized by the provision of a cooling oil line extending axially through each of the support shafts, and a radially extending port associated with each of said cooling oil lines for introducing cooling oil to each of the clutch pack assemblies.

* * * * *